Jan. 3, 1956  J. E. PERRIN  2,729,307
LUBRICATING SYSTEM
Filed May 10, 1954  2 Sheets-Sheet 1
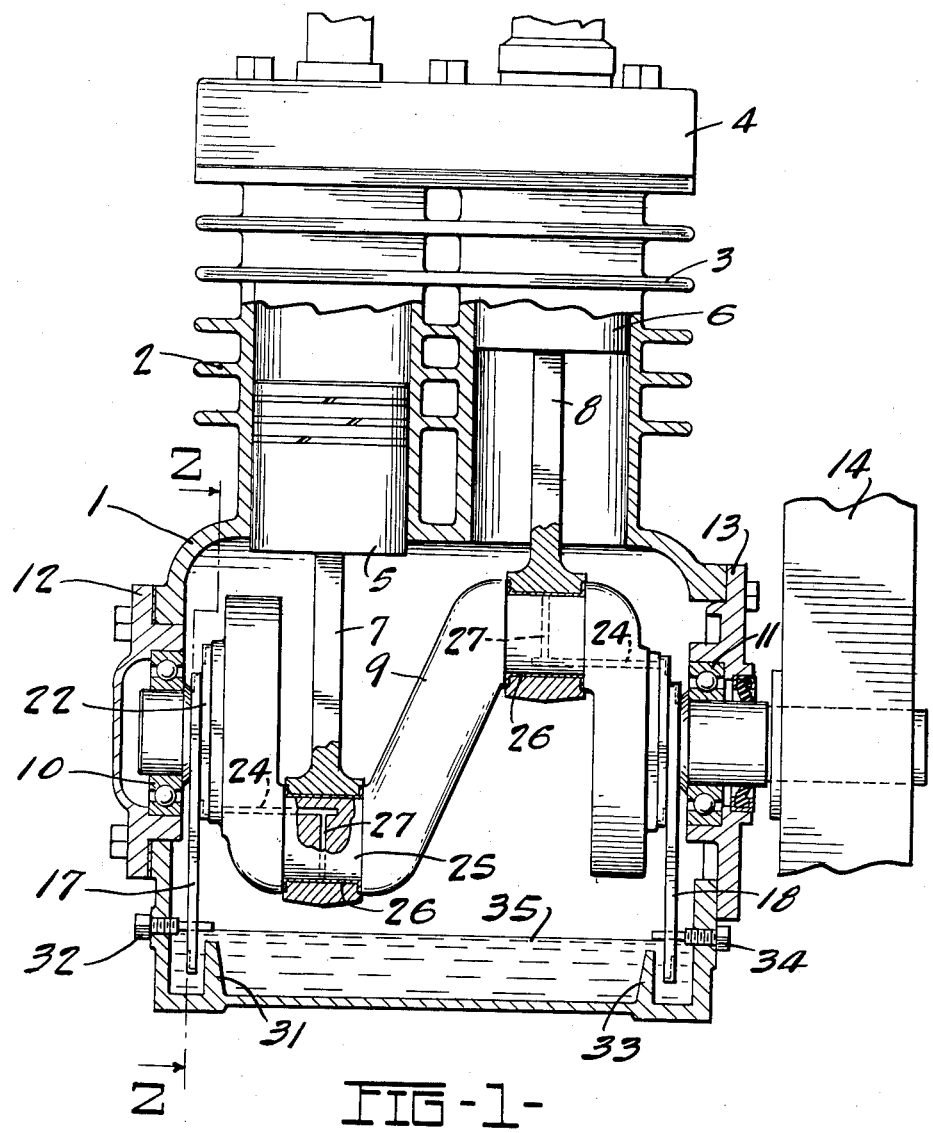
FIG-1-
INVENTOR:
JAMES E. PERRIN.
BY
W. P. Carr
ATTY.

Jan. 3, 1956
J. E. PERRIN
2,729,307
LUBRICATING SYSTEM
Filed May 10, 1954
2 Sheets-Sheet 2
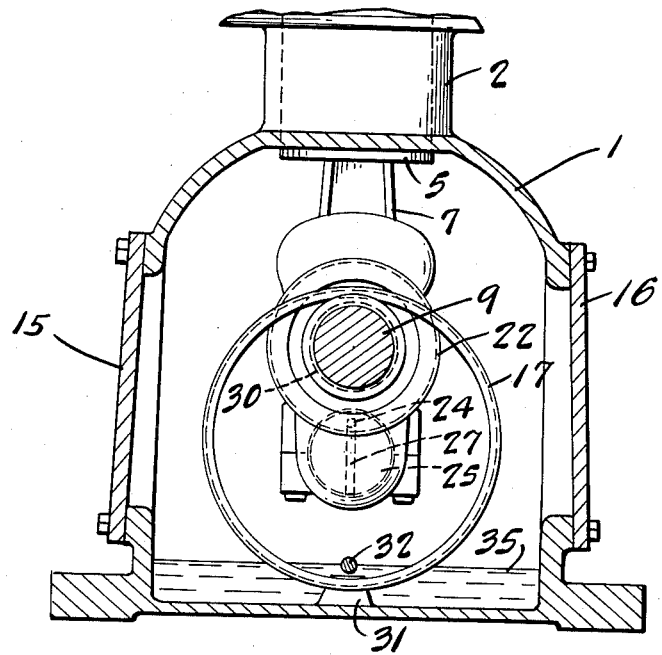
FIG-2-
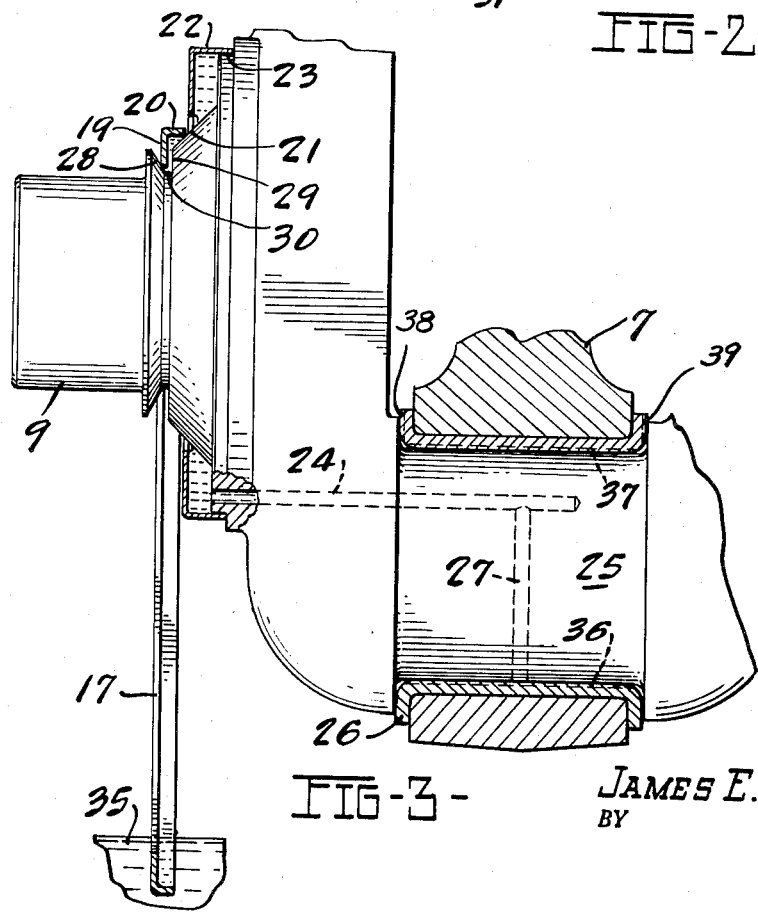
FIG-3-
INVENTOR:
JAMES E. PERRIN.
BY
W.P. Carr
ATTY.

United States Patent Office 2,729,307
Patented Jan. 3, 1956

2,729,307

LUBRICATING SYSTEM

James E. Perrin, Toledo, Ohio, assignor to The De Vilbiss Company, Toledo, Ohio, a corporation of Ohio Application May 10, 1954, Serial No. 428,508

8 Claims. (Cl. 184—11)

This invention relates to a lubricating system for piston machines such as air compressors and particularly to a lubricating system having an oil raising ring loosely suspended from and rotated by the piston driving crankshaft with the lower portion of the ring submerged in the oil in the crankcase.

Rings of this type have been used in various forms and with differing functions. In some cases the centrifugal force of their rotation has been utilized to throw the oil which they have carried from the lower portion of the crankcase against the cylinder walls, pistons, connecting rods, and upon the upper surfaces of the crankshaft. While the resulting lubrication may be fully effective this indiscriminate distribution is likely to apply an excess to the cylinder which finds its way into the air compression chamber and contaminates the air delivered by the compressor.

Another undesirable feature of such an arrangement is the gravity feed of oil to the connecting rod bearings on the crankshaft. The rotation of the crankshaft opposes the inward flow of oil and an adequate supply may thus fail to reach these bearings. The above objectionable properties of this arrangement are aggravated by higher speeds, when heating and the need of lubrication are increased.

An arrangement considered more reliable includes an annular oil cup fixed to and surrounding the crankshaft. This cup receives the oil delivered by the oil ring and directs it under the centrifugal force generated by the crankshaft rotation through a duct to the interior of the connecting rod bearings. This force feed provides a positive supply of lubrication to such bearings. Oil thrown from these bearings together with oil projected from the rotating ring is enough to take care of the lubricating requirements of other bearing surfaces of the machine.

This system has proved very satisfactory for many years. However, with improved designs of valves, valve springs, bearings and other components of compressors it has become feasible to increase the compressor speeds and to deliver greater volumes of air with smaller units.

Under these new conditions some difficulty has been encountered with the described system. With the higher speeds the temperature of the oil is raised to a point where the viscosity is considerably reduced. The resulting thinness of oil prevents as much oil being carried up from the crankcase and permits what is carried up to be more easily centrifugally projected from the ring without being fed to the annular receiving cup. Accordingly an insufficient supply of oil may reach the connecting rod bearings.

While rings have been designed which pick up an ample amount of oil even when the oil is of low viscosity, no suitable means have been devised for transferring thinned oil in a satisfactory volume from the ring into the oil receiving cup under ultra high speeds; at these higher speeds, the centrifugal action is so augmented that any oil freely released from the ring is strongly thrown tangentially from the ring.

The principal object of this invention is the provision of means for enabling the ring to raise a liberal quantity of oil and of means for drawing the elevated oil into the oil cup for subsequent forceful delivery to the interior of the connecting rod bearings.

An associated object is the provision of a ring of a simple and inexpensive design.

Another object is the provision of surfaces on the crankshaft which cooperate with the ring in serving the desired function.

Other objects and advantages of the invention will become apparent in the following description and with reference to the accompanying drawings in which:

Figure 1 is a vertical section of an air compressor embodying my invention;

Figure 2 is a section taken on the line 2—2 of Figure 1; and

Figure 3 is an enlarged view showing the crankshaft surfaces which cooperate with the oil ring of this embodiment of my invention.

The invention as herein illustrated is embodied in a single stage air compressor having a crankcase 1 with integral twin cylinders 2 and 3 over which is mounted a duplex cylinder head 4. Pistons 5 and 6 within the cylinders are reciprocated through connecting rods 7 and 8 by the crankshaft 9. The latter is mounted in main bearings 10 and 11 carried by bearing plates 12 and 13 bolted to opposite ends of the crankcase. Fixed to the exterior portion of the crankshaft 9 is a belt driven pulley 14. On the other two opposing sides of the crankcase are the removable inspection plates 15 and 16.

The lower portion of the crankcase provides a well or sump for the supply of lubricating oil. Oil raising rings 17 and 18 are loosely carried adjacent the ends of the crankshaft and the lower portions of the rings are submerged in the supply of oil.

Each ring has a right angled cross section including an inner portion 19 lying in a radial plane and an outer cylindrical portion 20. Both rings are similar in design and to simplify the description, reference will be principally directed to ring 17 which is additionally illustrated in the enlarged view of Figure 3. The ring 17 is supported on one side at the edge of its outer cylindrical portion 20 upon the truncated cone 21 of the crankshaft 9. This cone is coaxial with the crankshaft axis with its conical surface angled thereto at 45°. The larger base of the cone 21 extends within an annular oil receiving cup 22 press fitted over a cylindrical shoulder 23 of the crankshaft. The opening of the cup faces radially inwardly toward the cone 21. From the chamber defined by the cup a horizontal passage 24 leads to the interior of the adjacent crankpin 25 which carries the bearing 26 for the connecting rod 7. A duct 27 from the passage 24 communicates with the inner surface of the bearing 26.

The ring is supported on the other side away from the cone 21 on an opposed conical frustum 28 of lesser dimensions than cone 21. Its conical surface is also angled at 45° to the axis of the crankshaft.

The inner edge of the radial portion 19 of the ring rests upon the frustum 28. Between the cone 21 and the frustum 28 are a radial planar section 29 truncating the cone 21 and a coaxial cylindrical strip 30 joining the narrow end of the frustum 28 to the base of the section 29. The ring 17 only contacts the opposed conical elements, being spaced from section 29 and the strip 30.

The ring 17 is prevented from being dislodged by an upstanding lug 31 cast integral with the bottom wall of the crankcase and by a pin 32 threaded through the side wall of the crankcase and extending through the ring and above the lug 31. A corresponding lug 33 and pin 34 restrain any irregular movement of oil ring 18.

In operation, the oil ring 17 is caused to rotate by its supporting contact with the rotating crankshaft 9. When passing through the body of oil 35 in the sump of the crankcase, the ring is thoroughly coated with oil. At high speeds most of this oil is thrown off before reaching the contact area between the ring and the crankshaft. This is particularly true of the oil on the outer periphery of the cylindrical portion 20 of the ring and on the side of the radial section 19 toward the adjacent end of the crankshaft.

On the other hand the oil carried on the inner periphery of portion 20 is inclined to be held there by centrifugal force and the oil on the side of the radial section 19 away from the adjacent end of the crankshaft is moved therefrom by centrifugal force to the inner periphery of portion 20. When the edge of this inner peripheral surface contacts the 45° angle of the truncated cone 21 the oil is drawn from this surface to the cone 21 by joint capillary and centrifugal action and the angle of the cone is sufficiently steep to keep the oil thereon while it moves up into the cup 22. The rate of delivery of oil maintains the cup in filled condition. This accumulation of oil is thrust radially and applies a strong force that propels the oil under pressure through passage 24 and duct 27 to the exterior of the crankpin 25.

From the outlet of duct 27 the oil spreads at a limited rate over the surface of the crankpin 25 restrained by the close clearance between the crankpin and the bearing 26 and by the small size of the two distributing grooves 36 and 37 which cross the bearing along diametrically opposite lines. This metering of the oil is designed to provide a limited excess flow to the bearing 26 to the extent only that there is sufficient to be thrown upwardly for the necessary lubrication of the piston 5, its piston pin and the main crankshaft bearing 10. The escape of a measured amount of oil from the bearing is facilitated by radial grooves 38 and 39 communicating with the ends of transverse grooves 36 and 37. Oil pollution of the air compressed in the cylinder 2 from too heavy a discharge is thereby avoided. This is of special importance when the compressed air is utilized for the spray application of high grade finishing materials as the qualities of such materials are seriously impaired by the intermixture of non-drying petroleum oils. Also, oil in the air is objectionable for many other industrial operations.

The success of this invention is attributed to several features. One of special significance is the oil retaining surface on the ring 17 which faces radially inwardly to hold the oil in opposition to the radial thrust given the oil by centrifugal action. In the selected embodiment such a surface is provided by the inner periphery of the cylindrical portion 20. While the oil holding capacity would be increased by having such a surface indented, it is not believed that such an arrangement would materially augment the volume of oil drawn from the ring to the cone 21.

A somewhat complementary convex annulus on the crankshaft protruding into such an indentation would displace some of the oil in the depressed region which would otherwise be retained there by centrifugal force and move it toward the edge for deposit on the cone. Care would have to be exercised in such a modified design to guard against actual contact between the annulus and the indentation which could raise the contacting edge of the ring away from the cone. A feature of the invention considered of special importance is the maintenance of the edge of the oil retaining surface in direct contact with the oil delivering cone while keeping the balance of the surface free of any contacts which would prematurely dislodge or release the oil from the retaining surface.

If drawn or impelled from the retaining surface to an air space or otheswise than directly to a fairly steep and continuous cone the oil is apt to be scattered by the high centrifugal effect.

It may be noted that in the selected embodiment the retaining surface has only one escaping edge with the other side blocked by the radially extending portion 19 and that the other supporting edge of the ring is spaced radially inwardly from the retaining and discharging area. A definite contact between the lip or cylindrical portion 20 is insured by having the ring supported by the opposed cones and shaped to be spaced from other intervening surfaces. While contact between the radial portion 19 of the ring and the planar section 29 of the crankshaft would not in itself be disruptive of proper functioning, it would be undesirable if it interfered with the meeting of the edge of the lip 20 with the cone 21.

It is to be understood that the chosen embodiment of my invention is a preferred form but one capable of variation and modification within the broad concepts involved.

What I claim is:

1. In a lubricating system for a compressor or the like, a piston within a cylinder, a connecting rod for driving the piston, a crankcase providing an oil sump, a crankshaft extending horizontally above the oil sump, a connecting rod bearing on the crankshaft, a truncated conical surface on the crankshaft and coaxial therewith, said conical surface having a large diameter end and a small diameter end, an oil receiving cup adjacent and overhanging the large diameter end of the conical surface for receiving oil therefrom, an oil delivering passage interiorly of the crankshaft from the oil cup to the connecting rod bearing, a rotatable oil raising ring encircling and depending from the crankshaft, the lower portion of the ring passing through the oil in the sump, an edge of the ring resting on the conical surface, an annular section of ring adjacent the edge, said section having an inner periphery of cylindrical form extending from the edge above and in spaced relation to the conical surface toward the small diameter end of the conical surface, and annular means on the crankshaft beyond the small diameter end of the conical surface supporting the ring against the conical surface, whereby, when the ring is rotated through turning of the crankshaft, oil is carried upwardly from the sump upon the inner periphery of cylindrical form and is drained therefrom by centrifugal and capillary action across the edge of the ring to the conical surface.

2. A lubricating system as set forth in claim 1 in which there is a radially inwardly extending annular portion of the oil raising ring separated from the edge by the annular section.

3. A lubricating system according to claim 1 in which the annular means on the crankshaft is a frustum of a cone of lesser dimensions than the truncated conical surface.

4. A lubricating system according to claim 1 in which the oil receiving cup is annular in form and surrounds the full periphery of the large diameter end of the conical surface.

5. A lubricating system according to claim 1 in which there are passages associated with the bearing which limit the volume of oil released to the crankcase from the bearing.

6. A lubricating system according to claim 1 in which the conical surface is angled at approximately 45° to the axis of the crankshaft.

7. A lubricating system according to claim 1 in which the conical surface and the annular means are inclined toward each other and toward the axis of the crankshaft at an angle to said axis of 45°.

8. In a lubricating system for a compressor or the like, a piston within a cylinder, a connecting rod for driving the piston, a crankcase providing an oil sump, a crankshaft extending horizontally above the oil sump, a connecting rod bearing on the crankshaft, a truncated conical surface on the crankshaft and coaxial therewith, said conical surface having a large diameter end and a small diameter end, an oil receiving cup adjacent and overhanging the large diameter end of the conical surface for receiving oil therefrom, an oil delivering passage interiorly of the crankshaft from the oil cup to the connecting rod bearing, annular means on the crankshaft adjacent the small diameter end of the conical surface, a rotatable oil raising ring encircling and depending from the crankshaft, the lower portion of the ring passing through the oil in the sump, a first edge of the ring resting on the conical surface, an annular section of the ring adjacent the first edge, said section having an inner periphery of cylindrical form extending away from the first edge in spaced relation to the conical surface, and a second edge of the ring on the other side of the annular section from the first edge, the inner diameter of the ring being less at the location of the second edge than at the location of the first edge, said second edge resting on the annular means on the crankshaft, whereby the ring is rotatably supported between the annular means and the conical surface, and whereby, when the ring is rotated, through turning of the crankshaft, oil is carried upwardly from the sump upon the inner periphery of cylindrical form and is drained therefrom by centrifugal and capillary action across the first edge to the conical surface.

References Cited in the file of this patent

UNITED STATES PATENTS

| | | |
|---|---|---|
| 1,869,362 | Ackerman | Aug. 2, 1932 |

FOREIGN PATENTS

| | | |
|---|---|---|
| 125,930 | Great Britain | May 1, 1919 |
| 802,550 | Germany | Feb. 15, 1951 |